No. 665,625. Patented Jan. 8, 1901.
H. S. AMWAKE.
PRIMARY BATTERY.
(Application filed Mar. 2, 1900.)
(No Model.) 2 Sheets—Sheet 1.
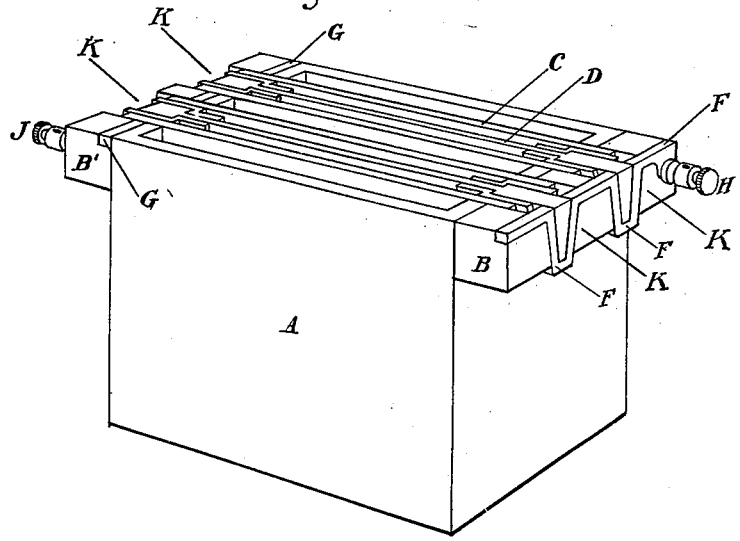
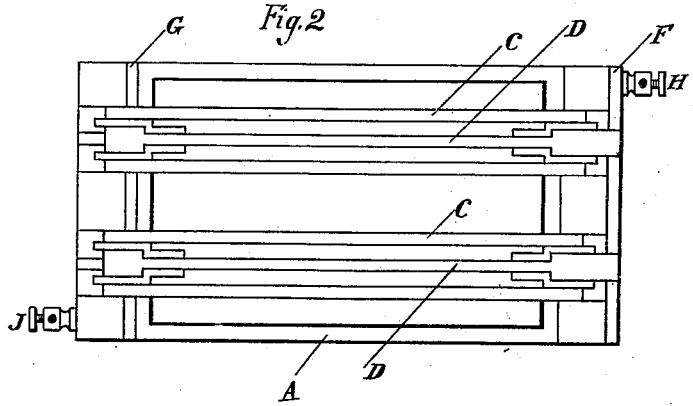
WITNESSES:
Harry B Longaere
Jos H Wilson
INVENTOR
Harry S Amwake
By J off Robertson
Attorney No. 665,625. Patented Jan. 8, 1901.
H. S. AMWAKE.
PRIMARY BATTERY.
(Application filed Mar. 2, 1900.)
(No Model.) 2 Sheets—Sheet 2.
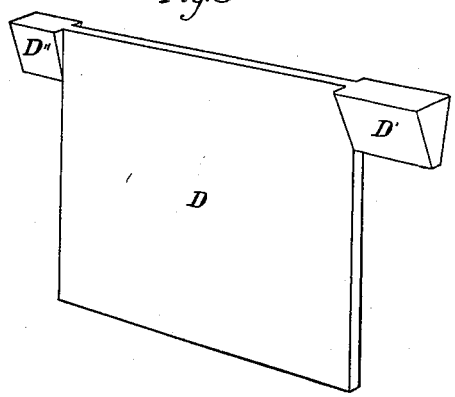
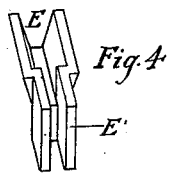
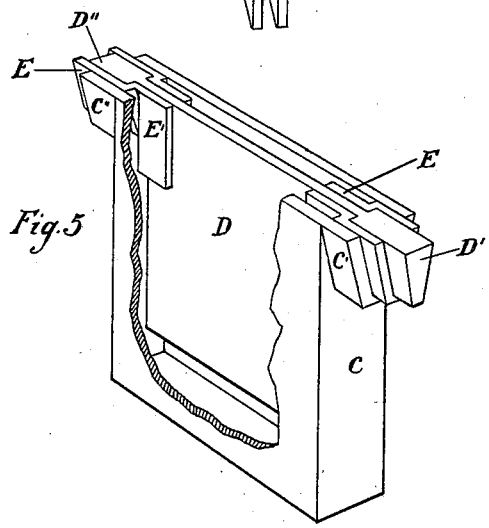
WITNESSES:
Harry B Longaere
Jos. H. Wilson
INVENTOR
Harry S. Amwake
By J. M. Robertson
Attorney

UNITED STATES PATENT OFFICE.

HARRY S. AMWAKE, OF CAMDEN, NEW JERSEY, ASSIGNOR OF ONE-HALF TO JOSEPH H. WILSON AND ABRAHAM M. GEISINGER, OF PHILADELPHIA, PENNSYLVANIA.

PRIMARY BATTERY.

SPECIFICATION forming part of Letters Patent No. 665,625, dated January 8, 1901.

Application filed March 2, 1900. Serial No. 7,087. (No model.)

*To all whom it may concern:*

Be it known that I, HARRY SKILES AMWAKE, a citizen of the United States, residing at Camden, county of Camden, and State of New Jersey, have invented certain new and useful Improvements in Primary Electric Batteries, of which the following is a specification.

The objects of my invention are the construction of an electric battery which will, first, permit the several elements and parts to be assembled and removed in the simplest possible manner, and, second, increase the electromotive force of the cell and maintain same while in action.

Referring to the accompanying drawings, Figure 1 is a perspective view of a battery containing two cells. Fig. 2 is a plan view of the same. Fig. 3 is a perspective view of the zinc element. Fig. 4 is a perspective view of the insulator; and Fig. 5 is a perspective view of the carbon element, the near side of which is broken away to show internal arrangement.

As illustrated in Fig. 5, my carbon element C is a rectangular box, molded or formed out of pure carbon, with closed sides, ends, and bottom and open only at the top. On each end at the top are the projections C' and C'', which are integral parts of said box. Said projections are V-shaped, as shown, to engage with similar-shaped grooves in the battery-casing A, shown, as at K, in the lugs B and B' of said casing A, and with the superposed parts E and D, as illustrated in Fig. 5. The said V shape is an essential feature of my form of constructions and appears in all the ends of my several elements and associated parts. Such a form permits the assembling of said parts and the removal of the same in a few moments, and when they are so assembled they fit and lock into one another by their mere weight in a very simple and effective manner and without any mechanical devices to secure them.

D is my zinc element, which is a simple plate of zinc with the V-shaped projections D' and D'', the same being homogeneous parts of said plate.

E represents the insulators, which are preferably of porcelain, hard rubber, or fiber. Said insulators have the arms or extensions E' on their inner ends to support in place the zinc element D, as shown in Fig. 5.

F signifies the copper connecting-strip, with which the zinc element D makes contact. Said strip ends in the negative terminal H. On the opposite side of the battery a similar connecting-strip G is shown ending in the positive terminal J. Said strip makes contact with the carbon element C. Both of said strips G and H are conformed to the V shape of the ends of said carbon and zinc elements, being fitted into the similar-shaped grooves in the battery-casing A, as shown at K, in the lugs B and B' of Fig. 1. It will be observed that one of the projections—namely, D' of the plate D—is elongated in order that the contact with the connecting-strip F may be made beyond the insulator E.

In charging said battery I use for electrolytes the following solutions, namely: for the zinc, sodium hydrate and ordinary water in equal proportions, weight for weight. Said solution is of course placed inside my carbon box C, and for and surrounding said carbon elements on their outsides I use about fifteen per cent. of sulfuric acid in ordinary water and ferric oxid in powdered form of equal weight with the said sulfuric acid and water. In action the said zinc solution attacks the zinc and produces hydrogen, which passes through the walls of the said carbon box into the solution surrounding the same on the outside and combining with the same forms water. There is, consequently, no polarization and no counter electromotive force, and the full force of the battery is unimpaired. On the contrary, the electromotive force increases rather than decreases in action.

For the recovery of the zinc deposited by action in its surrounding solution I place said solution, when exhausted, in an electroplating apparatus, together with several of my zinc plates, and recover and redeposit said dissolved zinc upon said plates. The carbon solution may be regenerated by aeration, which restores the action of the ferric oxid. Both these methods are simple and inexpensive and at the same time effective. The cost of maintaining a battery is in consequence greatly reduced.

What I claim is—

1. In a primary electric battery a case provided with V-shaped grooves in two opposite walls of the same, positive and negative copper connections also V-shaped to fit into said grooves, the negative element consisting of a hollow vessel of carbon open only at the top, provided with two opposite V-shaped projections or arms to engage with and rest upon the grooves in the walls of the battery-case, one of said arms making contact with the copper connection which ends in the positive terminal, said hollow carbon vessel containing within itself, suspended by V-shaped projections and insulated from said carbon vessel, a rectangular plate of zinc and in addition an electrolyte, said carbon vessel being surrounded on its outside by an electrolyte dissimilar in character to the one within said vessel, said zinc element being provided with a projection to extend beyond said carbon vessel and intervening insulator to make contact with the copper connection which ends in the negative terminal, substantially as illustrated and described.

2. An electric battery consisting of a carbon element, a zinc element, and insulators to separate the same, the whole contained in a case provided with V-shaped grooves in two opposite walls of the same, said elements and said insulators provided with V-shaped projections to engage with and lock into each other and with said V-shaped grooves in said battery-case, substantially as illustrated and described.

3. A primary electric battery consisting of a case, copper connecting-strips on two opposite walls of the same, a plurality of porous carbon cups within said case, said cups adapted to be readily removed from said case, and provided with proper insulation and means for making contact with one of said copper strips, said carbon cups containing zinc plates and an electrolyte, said zinc plates properly insulated and adapted to be readily removed from said cups, and provided with means for making contact with the other of said copper strips, said porous carbon cups being surrounded on their outsides with an electrolyte dissimilar to the one within said cups, substantially as described.

In testimony whereof I have hereunto set my hand in the presence of two witnesses.

HARRY S. AMWAKE.

Witnesses:
 HARRY B. LONGACRE,
 JOS. W. ROBERTSON.